United States Patent
Sautter et al.

(10) Patent No.: US 12,485,909 B2
(45) Date of Patent: Dec. 2, 2025

(54) METHOD FOR DETERMINING A TRAJECTORY FOR CONTROLLING A VEHICLE

(71) Applicant: Robert Bosch GmbH, Stuttgart (DE)

(72) Inventors: Peter Sautter, Lauffen (DE); Georg Mayer, Ditzingen (DE); Ulrich Kersken, Diekholzen (DE); Folko Flehmig, Stuttgart (DE); Christian Connette, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 136 days.

(21) Appl. No.: 18/006,005

(22) PCT Filed: Jul. 21, 2021

(86) PCT No.: PCT/EP2021/070392
§ 371 (c)(1),
(2) Date: Jan. 19, 2023

(87) PCT Pub. No.: WO2022/018139
PCT Pub. Date: Jan. 27, 2022

(65) Prior Publication Data
US 2023/0294717 A1    Sep. 21, 2023

(30) Foreign Application Priority Data

Jul. 22, 2020 (DE) .................. 10 2020 209 214.1

(51) Int. Cl.
*B60W 50/029* (2012.01)
*B60W 50/00* (2006.01)

(52) U.S. Cl.
CPC ...... *B60W 50/029* (2013.01); *B60W 50/0097* (2013.01); *B60W 2050/0292* (2013.01)

(58) Field of Classification Search
CPC ........... B60W 50/029; B60W 50/0097; B60W 2050/0292; B60W 30/0956
(Continued)

(56) References Cited

U.S. PATENT DOCUMENTS 9,645,577 B1   5/2017  Frazzoli et al.
9,950,722 B2 *  4/2018  Kumar .................... B61L 27/40
(Continued)

FOREIGN PATENT DOCUMENTS

DE   10 2012 018 122 A1   3/2013
DE   10 2013 202 054 A1   8/2013
(Continued)

OTHER PUBLICATIONS

Li, Xiaopeng et al. "A Piecewise Trajectory Optimization Model for Connected Automated Vehicles: Exact Optimization Algorithm and Queue Propagation Analysis." Transportation research. Part B: methodological 118 (2018): 429-456. Web. (Year: 2018).*
(Continued)

*Primary Examiner* — Russell Frejd
*Assistant Examiner* — Keith A von Volkenburg
(74) *Attorney, Agent, or Firm* — Maginot, Moore & Beck LLP

(57) ABSTRACT

A method includes receiving sensor data which have been generated by a sensor system, in a control module of a vehicle computer; inputting the sensor data into a safety algorithm to detect safety-relevant objects; inputting the sensor data into a comfort algorithm to detect comfort-relevant objects; estimating future states of the objects using an environment model which represents the environment of the vehicle and in which the objects are stored and tracked over time; calculating a safety trajectory taking into account safety rules and a comfort trajectory taking into account comfort rules based on the estimated future states of the
(Continued)

detected objects; using the comfort trajectory to control the vehicle if the comfort trajectory satisfies the safety rules; and using the safety trajectory to control the vehicle if the comfort trajectory does not satisfy the safety rules.

19 Claims, 2 Drawing Sheets

(58) Field of Classification Search
USPC .......................................................... 701/27
See application file for complete search history.

(56) References Cited

U.S. PATENT DOCUMENTS

| | | | | |
|---|---|---|---|---|
| 9,989,964 | B2* | 6/2018 | Berntorp | G06F 18/24143 |
| 10,133,275 | B1* | 11/2018 | Kobilarov | B60W 60/0016 |
| 10,671,075 | B1* | 6/2020 | Kobilarov | G05D 1/0088 |
| 10,671,076 | B1* | 6/2020 | Kobilarov | G08G 1/166 |
| 10,678,248 | B2* | 6/2020 | Ford | B60W 30/095 |
| 11,738,772 | B1* | 8/2023 | Beller | B60W 30/09 |
| | | | | 701/26 |
| 2012/0089299 | A1* | 4/2012 | Breed | B60R 21/013 |
| | | | | 701/1 |
| 2018/0211117 | A1* | 7/2018 | Ratti | G06V 10/764 |
| 2019/0250617 | A1 | 8/2019 | Ford et al. | |
| 2019/0325595 | A1 | 10/2019 | Stein et al. | |
| 2020/0139959 | A1 | 5/2020 | Akella et al. | |
| 2022/0379917 | A1* | 12/2022 | Henke | B60W 60/0027 |

FOREIGN PATENT DOCUMENTS

| | | | | |
|---|---|---|---|---|
| DE | 10 2013 202 053 A1 | | 8/2014 | |
| DE | 10 2013 213 171 A1 | | 1/2015 | |
| DE | 10 2015 115 163 A1 | | 3/2017 | |
| DE | 10 2017 213 353 A1 | | 2/2019 | |
| DE | 112019000065 B4 | * | 1/2025 | ............... G06N 3/08 |
| EP | 3 431 354 A1 | | 1/2013 | |
| JP | 2001-22708 A | | 1/2001 | |
| JP | 2009-51356 A | | 3/2009 | |
| JP | 2019512824 A | * | 5/2019 | ........ B60W 60/0015 |
| JP | 2019-137321 A | | 8/2019 | |
| JP | 2019-171970 A | | 10/2019 | |
| JP | 2019-530609 A | | 10/2019 | |

OTHER PUBLICATIONS

International Search Report corresponding to PCT Application No. PCT/EP2021/070392, mailed Oct. 15, 2021 (German and English language document) (7 pages).

* cited by examiner

METHOD FOR DETERMINING A TRAJECTORY FOR CONTROLLING A VEHICLE

This application is a 35 U.S.C. § 371 National Stage Application of PCT/EP2021/070392, filed on Jul. 21, 2021, which claims the benefit of priority to Serial No. DE 10 2020 209 214.1, filed on Jul. 22, 2020 in Germany, the disclosures of which are incorporated herein by reference in their entirety.

The disclosure relates to a method for determining a trajectory for controlling a vehicle. Furthermore, the disclosure relates to a vehicle computer, to a vehicle system, to a computer program, and to a computer-readable medium for carrying out the method.

BACKGROUND

Automated driving places high demands on the safety of control components of a vehicle. At the same time, it is necessary to ensure the most pleasant driving experience. However, factors that affect the driving experience may be very different depending on the environment of the vehicle. It would therefore be desirable if such factors could be reliably detected in as many situations of the vehicle as possible. The requirements for the safety of the control components should still be able to be fulfilled.

A vehicle can have a sensor system for sensing an environment of the vehicle and a vehicle computer for processing sensor data and controlling the vehicle. The sensor system can comprise a plurality of different types of sensors, for example. The vehicle computer can be configured, for example, to combine sensor data of the individual sensors—also called sensor data fusion—to detect objects in the surroundings of the vehicle by evaluating the combined sensor data and to calculate a suitable trajectory of the vehicle taking into account future states of both the vehicle and the detected objects.

SUMMARY

In light of the above, a method, a vehicle computer, a vehicle system, a computer program and a computer-readable medium are presented with the approach presented here. Advantageous developments and improvements of the approach presented here emerge from the description.

Embodiments of the present disclosure advantageously enable an architecture of a vehicle computer to be divided into a safety domain for calculating the safest possible trajectories and a comfort domain for calculating the most comfortable possible trajectories. For example, a different algorithm for sensor data processing and/or trajectory calculation can be used for each of the two domains. This is advantageous in that each of the algorithms can be adapted specifically to the respective requirements of the domains—safety requirements and/or comfort requirements—so that both the detection accuracy and the computation efficiency can be increased.

A first aspect of the disclosure relates to a computer-implemented method for determining a trajectory for controlling a vehicle, wherein the vehicle is equipped with a sensor system for sensing an environment of the vehicle and with a vehicle computer for processing sensor data and controlling the vehicle. The method comprises the steps of: receiving sensor data, which have been generated by the sensor system, in a control module of the vehicle computer; inputting the sensor data into a safety algorithm which has been configured to detect safety-relevant objects on the basis of the sensor data; inputting the sensor data into a comfort algorithm which has been configured to detect comfort-relevant objects on the basis of the sensor data; estimating future states of the detected objects using an environment model which represents the environment of the vehicle and in which the detected objects are stored and tracked over time; calculating a safety trajectory taking into account safety rules and a comfort trajectory taking into account comfort rules on the basis of the estimated future states of the detected objects; checking whether the comfort trajectory satisfies the safety rules; using the comfort trajectory to control the vehicle if the comfort trajectory satisfies the safety rules; using the safety trajectory to control the vehicle if the comfort trajectory does not satisfy the safety rules.

A vehicle can be, for example, a passenger car, truck, bus or a motorcycle. Alternatively, a vehicle can also be understood as a robot.

The method can, for example, be carried out automatically by the vehicle computer. The vehicle computer can comprise hardware and/or software modules. Accordingly, the control module can be implemented as hardware and/or software. Among other things, the vehicle computer can comprise a processor, a memory and a bus system for data communication between the processor and the memory. In addition, the vehicle computer can comprise one or more interfaces for data communication with external devices, for example with other vehicles or infrastructure devices—also called car-to-x communication—or with the internet.

The sensor system can comprise at least one environment sensor such as, for example, an ultrasound sensor, radar sensor, lidar sensor, or a camera. In addition, the sensor system can comprise at least one driving dynamics sensor such as, for example, a rotation rate sensor, acceleration sensor, wheel speed sensor, or steering wheel angle sensor. Furthermore, the sensor system can comprise a location sensor for determining an absolute position of the vehicle with the aid of a global navigation satellite system such as GPS, GLONASS, or the like. The absolute position of the vehicle can additionally or alternatively be determined on the basis of sensor data of the driving dynamics sensor(s).

The vehicle computer can be configured to control, i.e., to steer, accelerate, decelerate, or navigate, the vehicle in a partially or fully automated manner by appropriately controlling actuators of the vehicle. The actuators can comprise, for example, at least one steering actuator, at least one brake actuator, and/or an engine control unit. To control the actuators, the vehicle can be equipped with one or more driver assistance functions, for example. Such a driver assistance function can be implemented as hardware and/or software and can be integrated into the vehicle computer, for example.

The sensor data can be outputs of individual sensors of the sensor system. For example, the outputs can be data generated by filtering and/or transforming raw data of the sensors. However, the sensor data may also be data generated by processing outputs of the sensors.

When an object is detected, an object class of the object, such as "oncoming vehicle", "pedestrian" or "road marking", as well as a current state of the object, for example its speed, position, and/or orientation relative to the vehicle and/or other recognized objects, can be detected in a plurality of successive time steps, for example. The detected object—that is, for example, its object class, speed, position and/or orientation—can be stored in an object list and updated continuously.

In this case, the safety trajectory and the comfort trajectory can be further calculated on the basis of the estimated current states of the detected objects.

In addition, an object can be detected using a digital map (see below).

For tracking the detected objects over time, state estimators, such as, for example, Bayesian filters, particle filters, or Kalman filters can be used.

The environment of the vehicle may be represented, for example, by an environment model which is configured to predict movements of the vehicle and other road users in a shared traffic space on the basis of the objects stored in the object list. The traffic space can be defined by recognized objects such as road markings, drivable regions, traffic signs, or traffic signal systems.

The vehicle and/or a recognized object can be localized, for example, by comparing a measured position of the vehicle and/or of the detected object with positions of objects stored in a digital map. The objects stored in the digital map can, for example, be integrated into the environment model.

The comfort algorithm and the safety algorithm can differ from one another. For example, the comfort algorithm can have been trained by machine learning, whereas the safety algorithm can be an algorithm with significantly simpler protection and access—for example, in accordance with SOTIF (Safety Of The Intended Functions) or with the ISO 26262 standard.

What is relevant to comfort can be, for example, the condition of a road on which the vehicle is moving. For example, it may be relevant for the comfort of the vehicle occupants whether the road is flat or uneven, has few bends or many bends, is paved or not, has an attractive landscape or is less appealing, is low-traffic or high-traffic, etc., whether pedestrians, cyclists, skateboarders or the like are present next to the road, whether special buildings such as, for example, hospitals are present, or whether special vehicles such as trucks, delivery carts, motorcycles or road cleaning vehicles are located on adjacent lanes or lanes which are further ahead, etc. In general, the comfort algorithm can be configured to detect and predict a significantly larger number of object classes in a greater range—for example, also objects far away from the road—than would be required for safe trajectory planning. By contrast, for the comfort of other road users, in particular for pedestrians or cyclists, it may be relevant, for example, whether the road on which the vehicle is moving is wet or dry, or soiled or clean, etc. It would be ideal to prevent, for example, other road users from being sprayed with water, soiled, or otherwise disturbed by the vehicle traveling past.

A safety-relevant object can be understood to mean an object which significantly influences or could influence the safety of the vehicle and/or other road users. For example, such an object can be objects or other road users with which the vehicle should not collide, or road markings, and the like.

A safety-relevant object can simultaneously also be a comfort-relevant object, and vice versa.

A safety rule can be, for example, a specified distance, a specified orientation and/or a specified relative speed of the vehicle with respect to safety-relevant objects such as other road users or road markings, etc.

Similarly, a comfort rule can be, for example, a specified distance, a specified orientation and/or a specified relative speed of the vehicle with respect to comfort-relevant objects.

A comfort rule can also be, for example, in the form of a machine learning algorithm, such as an artificial neural network which evaluates the environment model and/or the sensor data, such as camera images, and has been trained on the basis of the naturally observed driving behavior of humans.

In other words, the method is based on an architecture of the vehicle computer that is divided into the levels (or domains) of comfort and safety such that the algorithms best suited for them can be used in each level. Thus, for example, for the comparatively complex recognition of comfort-relevant features, appropriately trained machine learning algorithms, such as artificial neural networks, can be used; whereas, for the detection of safety-relevant features, algorithms which can be more easily secured and accessed can be used.

In order to keep the programming effort low, the same software components can be used, for example, for the different levels.

A second aspect of the disclosure relates to a vehicle computer which is configured to carry out a method according to an embodiment of the first aspect of the disclosure. Features of this method can also be features of the vehicle computer, and vice versa.

A third aspect of the disclosure relates to a vehicle system comprising a sensor system for sensing the environment of a vehicle, and to a vehicle computer according to an embodiment of the second aspect of the disclosure. Features of the method according to an embodiment of the first aspect of the disclosure may also be features of the vehicle system, and vice versa.

Further aspects of the disclosure relate to a computer program which carries out the method according to an embodiment of the first aspect of the disclosure when the computer program is executed by a vehicle computer according to an embodiment of the second aspect of the disclosure, and to a computer-readable medium on which such a computer program is stored.

The computer-readable medium can be a volatile or non-volatile data memory. For example, the computer-readable medium may be a hard disk, a USB memory device, a RAM, ROM, EPROM, or flash memory. The computer-readable medium can also be a data communication network that enables a program code to be downloaded, such as the Internet or a data cloud. Features of the method according to one embodiment of the first aspect of the disclosure can also be features of the computer program and/or of the computer-readable medium, and vice versa.

Ideas for embodiments of the present disclosure may be considered, inter alia, as being based on the concepts and findings described below.

According to one embodiment, outputs of the safety algorithm are further input into the comfort algorithm, wherein the comfort algorithm has been configured to detect the comfort-relevant objects additionally on the basis of the outputs of the safety algorithm. It can thus be achieved that certain safety rules are observed when detecting the comfort-relevant objects. In other words, the comfort algorithm can be made safer in this way by the safety algorithm.

It is also possible for raw sensor data, such as images, to be processed by the comfort algorithm without dedicated object recognition.

According to one embodiment, the comfort algorithm was trained by machine learning to detect comfort-relevant and/or safety-relevant objects on the basis of the sensor data. As a result, a comparatively high automated driving capacity can be achieved.

According to one embodiment, the comfort algorithm is based on an artificial neural network. The artificial neural network can be, for example, a multi-layer perceptron or a convolutional neural network.

According to one embodiment, a further safety trajectory is calculated for the transfer of the vehicle into a safe state taking into account further safety rules on the basis of the estimated future states of the detected objects. The further safety trajectory can be regarded as a risk-optimized trajectory for stopping the vehicle in a safe, i.e., risk-minimizing, state. For example, the vehicle can be brought to a standstill at a road edge by means of the further safety trajectory. The further safety trajectory is then used to control the vehicle when the calculation of the safety trajectory fails. The safety trajectory and the further safety trajectory can differ, for example, in that the latter transfers the vehicle to a safe state, while the former continues the journey and links to a comfort trajectory at a suitable future time.

According to one embodiment, the method further comprises the following steps: receiving the sensor data in a further control module of the vehicle computer, wherein the control module and the further control module are independently supplied with electrical power; inputting the sensor data into the safety algorithm by means of the further control module; estimating, by means of the further control module, future states of the detected objects using the environment model; calculating a further safety trajectory for transferring the vehicle into a safe state taking into account further safety rules on the basis of the estimated future states of the detected objects by means of the further control module; checking, by means of the further control module, whether the control module is operational; using the further safety trajectory to control the vehicle by means of the further control module if the control module is not operational. As a result, a redundancy can be created in order to transfer the vehicle, without an accident and securely, into a safe state when the vehicle computer fails.

According to one embodiment, the vehicle system comprises a control module which is configured to carry out the method according to one embodiment of the first aspect of the disclosure, and at least one further control module which can be supplied with electrical power independently of the control module and is also configured to carry out the method according to one embodiment of the first aspect of the disclosure.

According to one embodiment, the control module comprises software modules which are configured to carry out the method according to one embodiment of the first aspect of the disclosure. Furthermore, the further control module also comprises software modules which are configured to carry out the method according to one embodiment of the first aspect of the disclosure. The software modules of the further control module are at least partially copies of the software modules of the control module.

BRIEF DESCRIPTION OF THE DRAWINGS

Embodiments of the disclosure are described below with reference to the accompanying drawings, and neither the drawings nor the description should be construed as limiting the disclosure.

The figures are merely schematic and not true to scale. In the figures, identical reference signs refer to identical or identically acting features.

DETAILED DESCRIPTION

Figure 1:
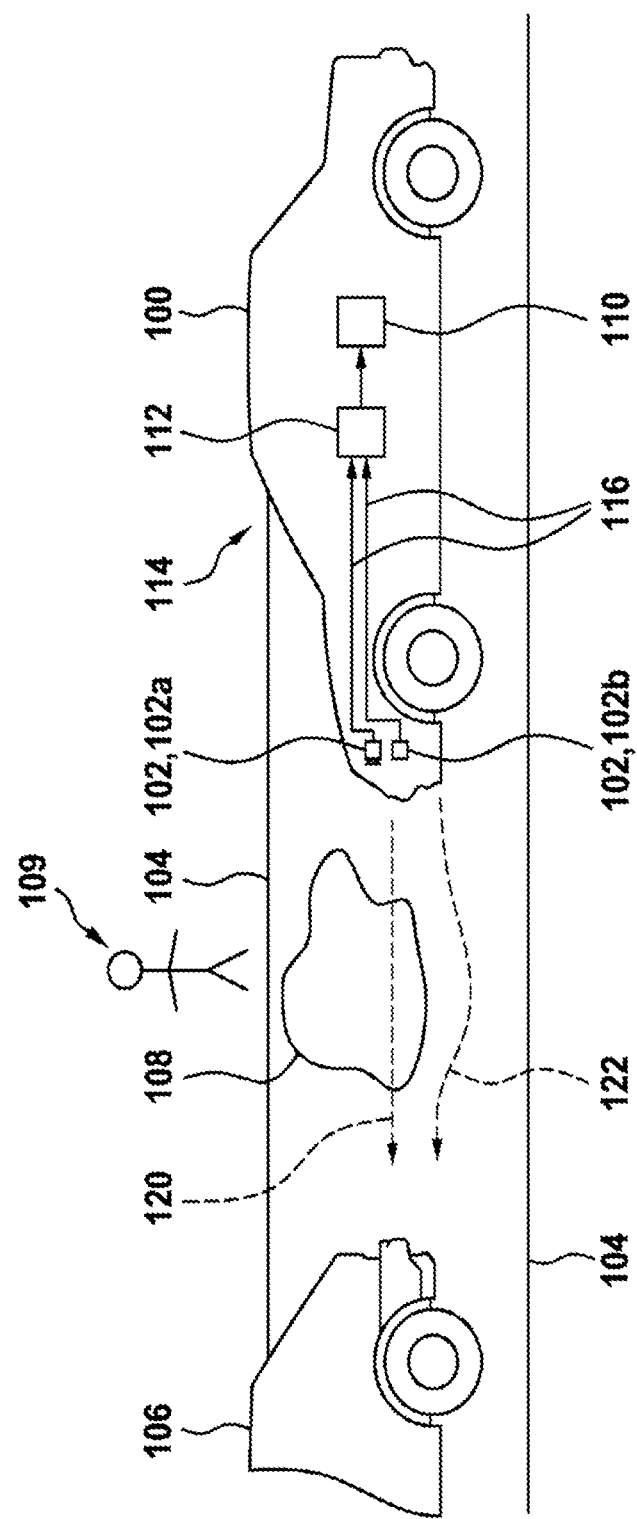
FIG. 1 shows a vehicle having a vehicle system according to an exemplary embodiment of the disclosure.

FIG. 1 shows a vehicle 100 equipped with a sensor system 102 for detecting objects in an environment of the vehicle 100 (here, by way of example, a road marking 104, a preceding vehicle 106, a puddle 108 and a pedestrian 109 standing in the vicinity of the puddle 108), a system of actuators 110, and a vehicle computer 112. The system of actuators 110 can comprise, for example, one or more steering or brake actuators and an engine control unit. The vehicle computer 112, the sensor system 102, and the system of actuators 110 are components of a vehicle system 114 which can be configured to control the vehicle 100 in a partially and/or fully automated manner. For example, the vehicle computer 112 can control the system of actuators 110 in such a manner that the vehicle 100 is steered, accelerated or decelerated.

For this purpose, the vehicle computer 112 initially receives sensor data 116 from individual sensors of the sensor system 102, here, by way of example, from a camera 102a and a radar sensor 102b, and calculates at least one safety trajectory 120 and one comfort trajectory 122 of the vehicle 100 (indicated by two dashed arrows) by evaluating the sensor data 116. In this case, the vehicle computer 112 recognizes the road marking 104, the preceding vehicle 106, the puddle 108 and the pedestrian 109. For the calculation of the comfort trajectory 122, the puddle 108 and the pedestrian 109 can be relevant, for example, whereas the road marking 104 and the vehicle 106 traveling ahead can be relevant for the calculation of the safety trajectory 120, in addition to the pedestrian 109.

In general, everything can be relevant to the calculation of the comfort trajectory 122, which is also relevant for the calculation of the safety trajectory 120 (the detection shown in FIG. 1, and bypassing a puddle, is only one example).

In this respect, the two trajectories 120, 122 can differ from one another because the safety trajectory 120 is calculated while prioritizing safety rules, and the comfort trajectory 122 is calculated while prioritizing comfort rules, as is described in more detail below with reference to FIG. 2. In simplified terms, the comfort trajectory 122 is designed in such a way that occupants of the vehicle 100 have as pleasant a driving experience as possible, and other road users are not adversely affected by the vehicle 100 at the same time. For example, in contrast to the safety trajectory 120, the comfort trajectory 122 circumvents the puddle 108 so that the pedestrian 109 is not sprayed with water when the vehicle 100 passes.

The vehicle computer 112 also checks whether the comfort trajectory 122 is sufficiently safe, for example whether the vehicle 100 will meet an oncoming vehicle while bypassing the puddle 108. If the comfort trajectory 122 is sufficiently safe, the vehicle computer 112 controls the system of actuators 110 in order to guide the vehicle 100 according to the comfort trajectory 122. Otherwise, the vehicle computer 112 uses the safety trajectory 120 to control the vehicle 100.

Figure 2:
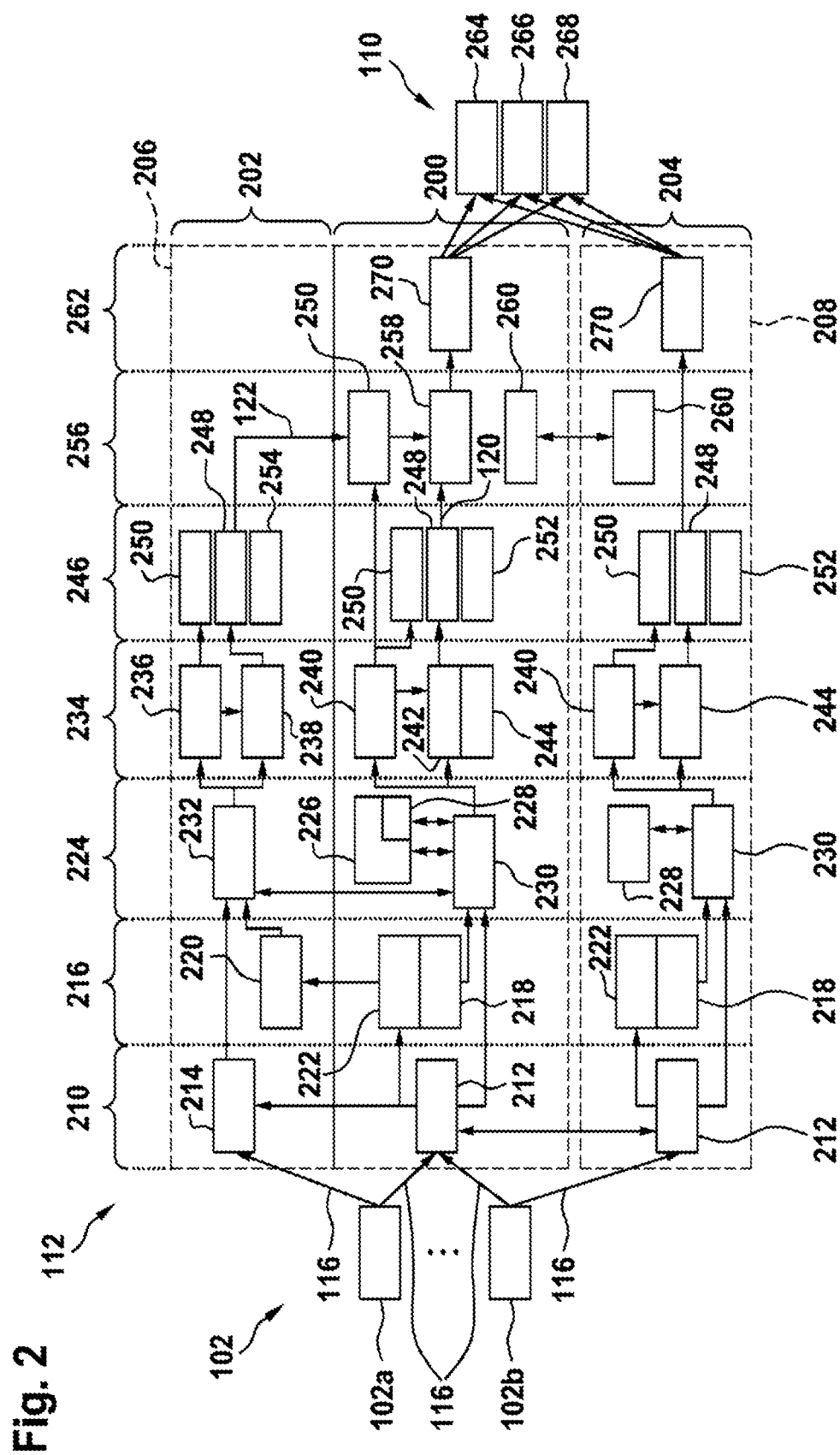
FIG. 2 shows the vehicle system from FIG. 1.

FIG. 2 shows a possible architecture of the vehicle computer 112 from FIG. 1. The architecture comprises a safety level 200, a comfort level 202, and a redundancy level 204. The levels 200, 202, 204 represent separate domains of the architecture of the vehicle computer 112. The safety level 200 and the comfort level 202 are implemented in a control module 206, which may also be referred to as the primary computing cluster. The redundancy level 204 is implemented in a further control module 208 which can be supplied with electrical energy independently of the control module 206. The further control module 208 can also be referred to as a secondary computing cluster. In the event of a failure, for example an interruption of a voltage supply, or a malfunction of the control module 206, the further control module 204 takes over the control of the vehicle 100.

The vehicle computer 112 is divided on all three levels 200, 202, 204 into different functional regions, which are described in more detail below. The modules contained in the functional regions can be implemented as hardware and/or software. Modules with the same reference numerals are to be understood as one and the same module, provided that it is implemented on different levels. For example, the modules of the further control module 208 may be at least partially copies of modules of the control module 206. Data flows between the modules are identified by arrows.

A first functional region 210 relates to the perception of the environment of the vehicle 100, and also to object detection by fusion of the sensor data 116 in a plurality of successive time steps. For this purpose, a safety perception module 212 is executed on the safety level 200 and the redundancy level 204, which safety perception module executes a safety algorithm into which the sensor data 116 are input and which provides recognized safety-relevant objects as outputs, for example, the preceding vehicle 106, the road marking 104 or the pedestrian 109. In parallel, a comfort perception module 214 is executed on the comfort level 202, which comfort perception module executes a comfort algorithm in which the sensor data 116 are likewise input and which provides the recognized comfort-relevant objects as outputs, for example the pedestrian 109 and the puddle 108.

The comfort algorithm can be based on a correspondingly trained classifier, for example an artificial neural network. In particular, the artificial neural network can be a deep neural network, such as a convolutional neural network with a plurality of trainable convolutional layers.

The safety algorithm can be a less computationally complex algorithm compared to the comfort algorithm. The safety perception module 212 can have been developed according to the quality standards ASIL-B(D) or ASIL-D.

A second functional region 216 relates to the localization of the vehicle 100 and the detected objects 104, 106, 108, 109 in a digital map which may comprise safety layers 218 and comfort layers 220. The safety layers 218 and comfort layers 220 can differ from one another in their safety requirements. The safety layers 218 are located in the safety level 200 and the redundancy level 204. The comfort layers 220 are located in the comfort level 202. The localization is carried out by a localization module 222 which can be executed on the safety level 200 and the redundancy level 204. Outputs of the localization module 222 can be input from the safety level 200 into the comfort layers 220 or integrated therein.

A third functional region 224 relates to an environment model 226 in which the detected objects 104, 106, 108, 109 and the vehicle 100 are stored as models and updated continuously.

The environment model 226 can have been developed, for example, according to ASIL-D and contain data of different reliability. The environment model 226 is located in the safety level 200 and can comprise a secure subgraph 228, the data of which can be used both in the safety level 200 and in the redundancy level 204. A safety access module 230 controls access to the data of the environment model 226.

The comfort level 202 comprises a comfort access module 232 which, on the one hand, can input data into the environment model 226, for example data relating to the detected comfort-relevant objects 108, 109 and, on the other hand, can read data from the environment model 226, for example data relating to the detected safety-relevant objects 104, 106, 109. In both cases, access is performed via the safety access module 230.

A fourth functional region 234 relates to the prediction of movements of the detected objects 104, 106, 108, 109 or of the vehicle 100 using the corresponding models in the environment model 226.

For this purpose, a comfort prediction module 236 can be implemented on the comfort level 202, which comfort prediction module estimates a future state of the environment model 226 considering comfort aspects. The comfort prediction module 236 can also generate comfort-oriented boundary conditions for subsequent trajectory planning, for example. Such boundary conditions can, for example, be distances to be maintained with respect to other road users for comfort reasons.

On the basis of outputs of the comfort prediction module 236, in a comfort state estimator 238, a comfort-oriented target state of the environment model 226 for the trajectory planning may be determined.

Similarly, a safety prediction module 240 may be implemented on the safety level 200 and the redundancy level 204, which safety prediction module estimates a future state of the environment model 226 considering safety aspects. The safety prediction module 240 can generate safety-oriented boundary conditions for subsequent trajectory planning, for example. Such boundary conditions can, for example, be distances to be maintained with respect to other road users for safety reasons.

On the basis of outputs of the safety prediction module 240, a safety-oriented target state of the environment model 226 for the trajectory planning may be determined in a safety state estimator 242. The safety state estimator 242 can be implemented solely on the safety level 200.

Furthermore, in a further safety state estimator 244, a risk-optimized safety-oriented target state of the environment model 226 can be determined, which represents a state of the lowest possible risk for the vehicle 100 and/or other road users. The further safety state estimator 244 can be implemented both on the safety level 200 and on the redundancy level 204.

In the event of a failure, the trajectory planning can take place, for example, on the basis of the risk-optimized target state.

A fifth functional region 246 relates to the trajectory planning. In this case, a solver 248 for calculating the safety trajectory 120 or comfort trajectory 122 can be implemented on all three levels 200, 202, 204.

A boundary condition evaluator 250 evaluates the respective boundary conditions. On the basis of the respective target states and outputs of the boundary condition evaluator 250, the solver 248 calculates a plurality of possible safety or comfort trajectories.

A safety trajectory weighter 252 implemented on the safety level 200 and the redundancy level 204 assigns costs to each of the possible safety trajectories on the basis of a safety cost function and selects the best suitable safety trajectory 120 therefrom.

Similarly, a comfort trajectory weighter 254 implemented on the comfort level 202 assigns costs to each of the possible comfort trajectories on the basis of a comfort cost function and selects the best suitable comfort trajectory 122 therefrom.

The safety cost function and the comfort cost function can be different functions and differ, for example, in their complexity.

It is possible that the solver 248 calculates a further safety trajectory, which may serve to transfer the vehicle 100 to a safe state, on the basis of the risk-optimized target state. The calculation of the further safety trajectory can take place analogously to the calculation of the safety trajectory 120. The further safety trajectory can be calculated both on the safety level 200, i.e., by means of the control module 206, and on the redundancy level 204, i.e., by means of the further control module 208, and thus redundantly.

A sixth functional region 256 relates to arbitration. In this case, a checking module 258 implemented on the safety level 200, which can also be referred to as an arbiter, checks whether the comfort trajectory 122 is compatible with the safety-oriented boundary conditions, or if these are infringed. If the comfort trajectory 122 is compatible with the safety-oriented boundary conditions, the checking module 258 outputs the comfort trajectory 122. Otherwise, the checking module 258 outputs either the safety trajectory 120 or the further safety trajectory. The latter can be output if the calculation of the safety trajectory 120 was unsuccessful for any reason.

Furthermore, a state monitor 260 can monitor all relevant components of the control module 206 or of the further control module 208. The state monitor 260 can be implemented both on the safety level 200 and on the redundancy level 204. For example, if the state monitor 260 of the redundancy level 204 detects an exceptional state of one of the relevant components of the control module 206, the further control module 208 assumes the control of the vehicle 100 on the basis of the further safety trajectory calculated by the further control module 208.

A seventh functional region 262 relates to the control of the system of actuators 110, for example a drive 264, a brake system 266 and a steering means 268 of the vehicle 100. For this purpose, a vehicle control module 270 is implemented on the safety level 200 and the redundancy level 204, which vehicle control module transmits corresponding control commands to the system of actuators 110. The system of actuators 110 is thus controlled redundantly via the safety level 200 and the redundancy level 204, wherein control commands from the safety level 200 have priority relative to control commands from the redundancy level 204 as long as the state monitor 260 does not detect any functional impairment, or even a failure of the safety level 200.

Finally, it should be pointed out that terms like "having," "comprising," etc., do not exclude other elements or steps, and terms like "a" or "an" do not exclude a plurality. Reference signs in the claims are not to be considered as limiting.

The invention claimed is:

1. A computer-implemented method for determining a trajectory for controlling a vehicle, the vehicle being equipped with a sensor system configured to sense an environment of the vehicle and with a vehicle computer configured to process sensor data and control the vehicle, the method comprising:
receiving sensor data, generated by the sensor system, in a control module of the vehicle computer;
inputting the sensor data into a safety algorithm configured to detect safety-relevant objects based on the sensor data;
inputting the sensor data into a comfort algorithm configured to detect comfort-relevant objects based on the sensor data, the comfort algorithm different from the safety algorithm, and the safety-relevant objects different from the comfort-relevant objects;
estimating future states of the detected safety-relevant objects using an environment model representing the environment of the vehicle;
estimating future states of the detected comfort-relevant objects using the environment model;
storing and tracking the detected safety-relevant objects and the comfort-relevant objects over time in the environment model;
applying safety rules to the environment model to calculate a safety trajectory based on the estimated future states of the detected safety-relevant objects;
applying comfort rules to the environment model to calculate a comfort trajectory based on the estimated future states of the detected comfort-relevant objects, the comfort rules different from the safety rules, and the comfort trajectory different from the safety trajectory;
checking whether the calculated comfort trajectory satisfies the safety rules;
using the calculated comfort trajectory to control the vehicle when the calculated comfort trajectory satisfies the safety rules and the comfort rules; and
using the calculated safety trajectory to control the vehicle when the calculated comfort trajectory does not satisfy the safety rules.

2. The method according to claim 1, wherein:
further outputs of the safety algorithm are input into the comfort algorithm; and
the comfort algorithm is configured to detect the comfort-relevant objects further based on the outputs of the safety algorithm.

3. The method according to claim 1, wherein the comfort algorithm has been trained by machine learning to detect at least one of the comfort-relevant objects and the safety-relevant objects based on the sensor data.

4. The method according to claim 3, wherein the comfort algorithm is based on an artificial neural network.

5. The method according to claim 1, wherein:
a further safety trajectory, configured to transfer the vehicle into a safe state, is calculated based on further safety rules based on the estimated future states of the detected safety-relevant objects and the comfort-relevant objects; and
the further safety trajectory is used to control the vehicle when the calculating of the safety trajectory fails.

6. The method according to claim 1, further comprising:
receiving the sensor data in a further control module of the vehicle computer, the further control module being supplied with electrical power independently of the control module;
inputting the sensor data into the safety algorithm using the further control module;
estimating, using the further control module, further future states of the detected safety-relevant objects and comfort-relevant objects using the environment model;
calculating, using the further control module, a further safety trajectory for transferring the vehicle into a safe state taking into account further safety rules based on the estimated further future states of the detected safety-relevant objects and comfort-relevant objects;
checking, using the further control module, whether the control module is operational; and
using the further safety trajectory to control the vehicle using the further control module in response to the control module not being operational.

7. The method according to claim 1, wherein the method is performed by a computer program comprising instructions that are executed by the vehicle computer.

8. The method according to claim 7, wherein the computer program is stored on a non-transitory computer-readable medium.

9. The method according to claim 1, wherein:
the detected comfort-relevant objects include a puddle, and
the detected safety-relevant objects include a vehicle and a road marking.

10. The method according to claim 9, wherein:
the calculated comfort trajectory circumvents the puddle, and
the calculated safety trajectory passes through the puddle.

11. The method according to claim 10, wherein:
the vehicle will meet an oncoming vehicle while circumventing the puddle and, therefore, the calculated comfort trajectory is determined not to satisfy the safety rules.

12. The method according to claim 1, wherein:
the safety rules include a first specified distance, a first specified orientation, and/or a first specified relative speed of the vehicle with respect to the detected safety-relevant objects; and
the comfort rules include a second specified distance, a second specified orientation, and/or a second specified relative speed of the vehicle with respect to the detected comfort-relevant objects.

13. A vehicle computer for determining a trajectory for controlling a vehicle, the vehicle computer being configured to:
receive sensor data generated by a sensor system of the vehicle;
input the sensor data into a safety algorithm configured to detect safety-relevant objects based on the sensor data;
input the sensor data into a comfort algorithm configured to detect comfort-relevant objects based on the sensor data, the comfort algorithm different from the safety algorithm, and the safety-relevant objects different from the comfort-relevant objects;
estimate future states of the detected safety-relevant objects using an environment model representing an environment of the vehicle;
estimate future states of the detected comfort-relevant objects using the environment model;
store and track the detected safety-relevant objects and the comfort-relevant objects over time in the environment model;
apply safety rules to the environment model to calculate a safety trajectory based on the estimated future states of the detected safety-relevant objects;
apply comfort rules to the environment model to calculate a comfort trajectory based on the estimated future states of the detected comfort-relevant objects, the comfort rules different from the safety rules, and the comfort trajectory different from the safety trajectory;
check whether the calculated comfort trajectory satisfies the safety rules;
use the calculated comfort trajectory to control the vehicle in response to the calculated comfort trajectory satisfying the safety rules; and
use the calculated safety trajectory to control the vehicle in response to the calculated comfort trajectory not satisfying the safety rules.

14. The vehicle computer according to claim 13 comprising:
a control module configured to (i) receive the sensor data, (ii) input the sensor data into the safety algorithm, (iii) input the sensor data into the comfort algorithm, (iv) estimate the future states, (v) calculate the safety trajectory, (vi) check whether the comfort trajectory satisfies the safety rules, (vii) use the comfort trajectory to control the vehicle, and (viii) use the safety trajectory to control the vehicle; and
at least one further control module supplied with electrical power independently of the control module, the at least one further control module configured to:
receive the sensor data;
inputting the sensor data into the safety algorithm;
estimate further future states of the detected safety-relevant objects using the environment model;
estimate further future states of the detected comfort-relevant objects using the environment model;
calculate a further safety trajectory for transferring the vehicle into a safe state based on further safety rules based on the estimated further future states of the detected safety-relevant objects and the estimated further future states of the detected comfort-relevant objects;
checking, using the further control module, whether the control module is operational; and
using the further safety trajectory to control the vehicle using the further control module in response to the control module not being operational.

15. The vehicle computer according to claim 14, wherein:
the control module comprises software modules configured to perform operations thereof;
the at least one further control module comprises software modules configured to perform operations thereof; and
the software modules of the at least one further control module are at least partially copies of the software modules of the control module.

16. The vehicle computer according to claim 13, comprising:
a safety level;
a comfort level; and
a redundancy level,
wherein each of the safety level, the comfort level, and the redundancy level are separate domains of the vehicle computer including corresponding software modules.

17. The vehicle computer according to claim 16, wherein:
the environment model is located in the safety level and includes a secure subgraph,
data of the secure subgraph is used both in the safety level and in the redundancy level, and
a safety access module is located in the safety level and is configured to control access to the data of the secure subgraph in the safety level.

18. The vehicle computer according to claim 17, wherein:
a safety prediction module is located in the safety level and is configured to receive the data of the secure subgraph from the safety access module, and
the safety prediction module is configured to estimate future states of the environment model.

19. A vehicle system comprising:
a sensor system configured to sense an environment of a vehicle and to generate corresponding sensor data; and
a vehicle computer configured to receive the sensor data of the sensor system and to control the vehicle, the vehicle computer further configured to:
input the sensor data into a safety algorithm configured to detect safety-relevant objects based on the sensor data;
input the sensor data into a comfort algorithm configured to detect comfort-relevant objects based on the sensor data, the comfort algorithm different from the safety algorithm, and the safety-relevant objects different from the comfort-relevant objects;
estimate future states of the detected safety-relevant objects using an environment model representing the environment of the vehicle;
estimate future states of the detected comfort-relevant objects using the environment model;
store and track the detected safety-relevant objects and the comfort-relevant objects over time in the environment model;
apply safety rules to the environment model to calculate a safety trajectory based on the estimated future states of the detected safety-relevant objects;
apply comfort rules to the environment model to calculate a comfort trajectory based on the estimated future states of the detected comfort-relevant objects, the comfort rules different from the safety rules, and the comfort trajectory different from the safety trajectory;
check whether the calculated comfort trajectory satisfies the safety rules;
use the calculated comfort trajectory to control the vehicle in response to the calculated comfort trajectory satisfying the safety rules; and
use the calculated safety trajectory to control the vehicle in response to the calculated comfort trajectory not satisfying the safety rules.

\* \* \* \* \*